United States Patent [19]

Takahashi et al.

[11] Patent Number: 4,763,206
[45] Date of Patent: Aug. 9, 1988

[54] APPARATUS FOR RECORDING VIDEO AND AUDIO SIGNALS

[75] Inventors: Takao Takahashi; Hajime Inoue, both of Tokyo, Japan

[73] Assignee: Sony Corporation, Tokyo, Japan

[21] Appl. No.: 849,903

[22] Filed: Apr. 9, 1986

[30] Foreign Application Priority Data

Apr. 15, 1985 [JP] Japan .................. 60-079985

[51] Int. Cl.$^4$ .................................... H04N 5/91
[52] U.S. Cl. .................................... 360/8; 360/191;
360/32; 360/9.1; 358/343
[58] Field of Search .............. 360/19.1, 30, 8, 32,
360/9.1, 70, 84; 358/343, 310, 330

[56] References Cited

U.S. PATENT DOCUMENTS

| | | | |
|---|---|---|---|
| 3,855,424 | 12/1974 | Tharmaratnam | 360/8 |
| 4,141,039 | 2/1979 | Yamamoto | 360/32 |
| 4,353,098 | 10/1982 | Heinz | 360/9.1 |
| 4,490,751 | 12/1984 | Kono | 360/19.1 |
| 4,490,753 | 12/1984 | Ito | 360/19.1 |
| 4,510,538 | 4/1985 | Sato | 360/84 |
| 4,541,020 | 9/1985 | Kimura | 360/9.1 |

Primary Examiner—Alan Faber
Attorney, Agent, or Firm—Alvin Sinderbrand

[57] ABSTRACT

In an apparatus for recording video and audio signals, and in which a video signal has its time base compressed to 1/N the time base of a standard television signal and the time base compressed video signal is recorded in slant tracks on a tape by rotary heads while the tape is driven so as to provide a recording format coincident with that of a standard video tape recorder, and with video information of one field being recorded in each track; there are further provided a time base compressor for compressing the time base of an input audio signal in correspondence to the time base compressed video signal, a frequency modulator for frequency modulating a carrier signal with the time base compressed audio signal, and a mixer for mixing the time base compressed and frequency modulated audio signal with the time base compressed video signal prior to recording with the latter by the rotary heads in the standard recording format.

2 Claims, 7 Drawing Sheets

FIG. 9A (S10)
FIG. 9B (SWP)
FIG. 9C (WCK)
FIG. 9D (RCK)
FIG. 9E (S20)
FIG. 9F (S30)
FIG. 9G (S40)

APPARATUS FOR RECORDING VIDEO AND AUDIO SIGNALS

BACKGROUND OF THE INVENTION

1. Field of the Invention

This invention relates generally to apparatus for recording video and audio signals, and more particularly is directed to such an apparatus suitable for recording an audio signal with its time base compressed.

2. Description of the Prior Art

Helical scan type video tape recorders (VTRs) are widely used in which a magnetic tape is helically wrapped around a tape guide drum with a wrap angle slightly larger than 180°. In such widely used or standard VTRs, two rotary magnetic heads, located at an angular spacing of 180° from each other on the tape guide drum, are rotated at a frame frequency, that is, 30 revolutions per second, and the rotary magnetic heads alternately contact the magnetic tape while the latter is transported at a predetermined or standard tape speed so that the rotary heads are operative alternately to record a video signal in successive slant or skewed tracks on the tape. In such standard VTRs, a video signal for one field is recorded in each skewed or slant track on the magnetic tape, and the audio signal is recorded in an audio track extending along one longitudinal edge portion of the tape. In a playback or reproducing mode, the successive skewed or slant tracks are scanned alternately by two similar rotary magnetic heads for reproducing the video signal from the magnetic tape, and a stationary head scans the longitudinally extending audio track for reproducing the audio signal therefrom.

From the standpoint of increasing the utility of the VTR, it is desirable that the latter be made small in size and light in weight. Further, when the VTR is small-sized and light in weight, it becomes possible to provide a unit in which such VTR is conveniently combined with a television camera. An important factor in limiting the reduction in size of the VTR is the tape guide drum and the associated mechanism for guiding the tape therearound. Therefore, a prerequisite to substantially decreasing the overall size of the VTR has been effecting reduction of the diameter of the tape guide drum therein.

However, if the diameter of the tape guide drum is merely reduced, the recording pattern on the tape guided by the small drum will not coincide with the recording pattern on a tape recorded in a standard VTR. Further, when a television camera and VTR are combined in a portable unit, it may be desirable to use such VTR only for recording, and to employ an existing or standard VTR for playback of the recorded tape. Therefore, it is desirable that the recording pattern effected with the reduced-diameter drum be the same as that achieved with the standard VTR.

In order to provide the same recording pattern as that provided by the conventional or standard VTR, it is enough that the magnetic tape be wrapped around the reduced-diameter tape guide drum with an increased tape wrap angle, provided that each track on the magnetic tape is scanned by a head located at substantially the same position on the drum. However, when high density recording of the video signal is to be effected, adjacent video tracks must be provided in a guard band-less format by respective rotary heads having gaps with different azimuths, that is, extending in different directions. Accordingly, the recording must be effected by two rotary heads with different gap azimuths, and the two rotary heads, of necessity, cannot occupy the same location on the drum, that is, the two heads must be at a distance from each other on the drum.

The above described problems have been solved in a manner disclosed in detail in U.S. Pat. No. 4,510,538 which has a common assignee herewith, and in which there is provided a video signal recording apparatus with a small-diameter tape guide drum which can achieve the same recording format as that provided by the conventional or standard VTR having two rotary magnetic heads with an angular spacing of 180° therebetween. In the video recording apparatus of that patent, the tape wrap angle about the small-diameter tape guide drum is increased, and suitable time base compression of the video signal supplied to the recording apparatus from an associated television camera is realized by changing the speed with which the horizontal lines are scanned in the television camera. However, the recording of the audio signal remains unchanged, that is, the tape transport speed is the same as that in the standard VTR and the audio signal is recorded, without special processing, in the usual audio track extending along a longitudinal edge portion of the tape. By reason of the relatively low tape transport speed, the audio signal recorded in the longitudinally extending audio track by a fixed head is of relatively poor quality or fidelity.

As VTRs with so-called Hi-Fi audio achieved by an AFM (audio frequency modulation) system have become available, a demand has developed for the provision of the combined VTR and television camera with similar high-quality audio recording. In the AFM system, for example, as disclosed in U.S. Pat. No. 4,490,751, also having a common assignee herewith, a carrier is frequency-modulated with the audio signal and is frequency-multiplexed with the usual frequency modulated luminance component and the frequency-converted chrominance component, whereupon the frequency-multiplexed audio, luminance and chrominance are recorded by the rotary heads in the skewed tracks on the magnetic tape. The last identified patent provides the AFM system in an otherwise standard VTR, that is, a VTR with a relatively large diameter tape guide drum having two rotary heads spaced 180° from each other. However, when the AFM system is applied to a VTR having a reduced-diameter tape guide drum with an increased tape wrap angle and with suitable time base compression of the video signal for maintaining the same recording format as the standard VTR, a problem arises. More particularly, since the AFM system records the audio signal by the same rotary head or heads used for recording the video signal, it becomes necessary to process or compress the time base of the audio signal in a manner compatible with the time base compression of the video signal.

OBJECTS AND SUMMARY OF THE INVENTION

Accordingly, it is an object of this invention to provide an apparatus for recording video and audio signals, and in which the audio signal and the video signal are time compressed.

It is another object of this invention to provide an apparatus for recording video and audio signals, as aforesaid, which can be applied to existing apparatus using ½ inch wide magnetic tape, such as those available under the tradename BETAMOVIE, and also to 8 mm/VTRs that use an 8 mm-wide magnetic tape.

It is a further object of this invention to provide for the recording of video and audio signals in a video tape recorder of the reduced-diameter rotary drum type.

According to an aspect of the present invention, in an apparatus for recording video and audio signals in which a video signal has its time base compressed to 1/N the time base of a standard television signal and is recorded on a tape in slant tracks with the video information of one field appearing in each track and with the recording format being coincident with that of a standard video tape recorder; an input audio signal is time base compressed in correspondence to the time base compressed video signal, and the time base compressed audio signal is frequency multiplexed on the video signal and then recorded with the latter.

In preferred embodiments, the dynamic range of the audio signal is compressed by noise reduction circuits with the resultant outputs being time base compressed to 1/N by time compressors, whereupon, the time base compressed outputs are frequency-modulated by frequency modulators and the modulated outputs are recorded on a recording medium together with the video signal.

The above, and other objects, features and advantages of the present invention, will become apparent from the following detailed description of preferred embodiments which is to be read in conjunction with the accompanying drawings, in which the same reference numerals designate corresponding elements and parts in the several views.

DESCRIPTION OF THE PREFERRED EMBODIMENTS

The present invention will now be described in detail in its application to an apparatus in which stereophonic left and right audio signals are supplied as an audio signal to be recorded, and these 2-channel audio signals are time base compressed and then recorded on a magnetic tape as first through fourth frequency modulated audio signals. Further, according to the present invention, these time base compressed and frequency modulated audio signals are recorded on the magnetic tape together with a color video signal. Of course, when the present invention is applied to a VTR having a recording format which conforms to the standardized format of the aforementioned 8 mm VTR, the first through fourth frequency modulated audio signals are not necessary but instead, it is sufficient that a single frequency modulated audio signal is time base compressed and then recorded along with the color video signal.

Figure 1:
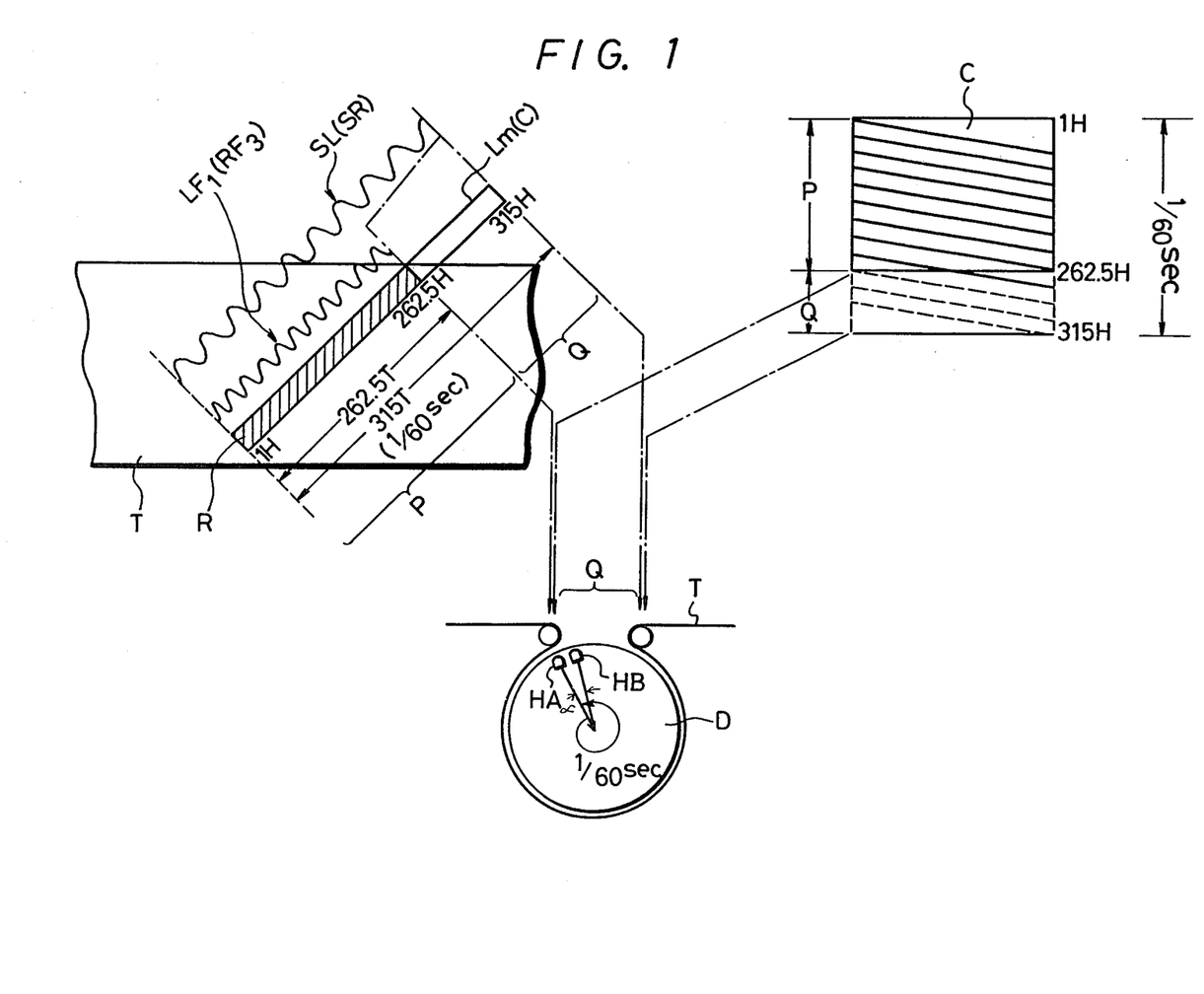
FIG. 1 is a schematic representation of the present invention useful for explaining the relationship among a recording pattern on a magnetic tape, the positions of rotary heads and a target screen of a video camera.

Referring to FIG. 1 which schematically shows the relationship among a recording pattern on the magnetic tape, magnetic heads of the VTR and a target screen of a video camera according to the invention, it will be seen that the recording format of a recording pattern R (hatched area) formed on a magnetic tape Ta is the same as that recorded by a standard VTR, such as, for example, a BETAMAX (trade name) VTR). In this embodiment, a signal having 262.5 H (H is a horizontal line) is recorded, and a signal supplied from a TV or video camera in the period corresponding to an ineffective area Q in which magnetic heads HA and HB mounted on a reduced-diameter drum D are not in contact with the magnetic tape Ta is lost, that is, is not recorded. In other words, of the signals issuing from the camera which an electron beam thereof scans a target screen C of the camera, only the signal produced when the beam scans an effective area P is recorded on the magnetic tape Ta, while the signal produced when the beam scans an over-scan area (262.5 H to 315 H) Q is supplied to the magnetic heads HA and HB as a dummy signals only. The signal is recorded on the magnetic tape Ta only during a time period of 262.5 T (T is the period for each horizontal line) by the magnetic heads HA and HB in each revolution (1/60 sec) of the reduced-diameter drum D which corresponds to the time period 315 T.

However, an audio signal which is supplied through a microphone in synchronism with a video signal supplied from a video camera has no time portion corresponding to the over-scan area Q on the image pickup tube or TV camera. In other words, if an input audio signal SL (SR) is supplied to the magnetic heads HA and HB as it is, the audio signal corresponding to the ineffective or over-scan area Q will be lost. Accordingly, it is required to generate beforehand an audio signal $LF_1$ ($RF_3$) whose duration or time base is compressed to become equal to the recorded video signal R.

If the above mentioned video camera is a semiconductor element camera utilizing a CCD (charge coupled device) or the like, it is apparent that similar effects can be achieved by controlling the reading speed of each CCD element instead of controlling the scanning of the target screen by the electron beam.

Figure 2:
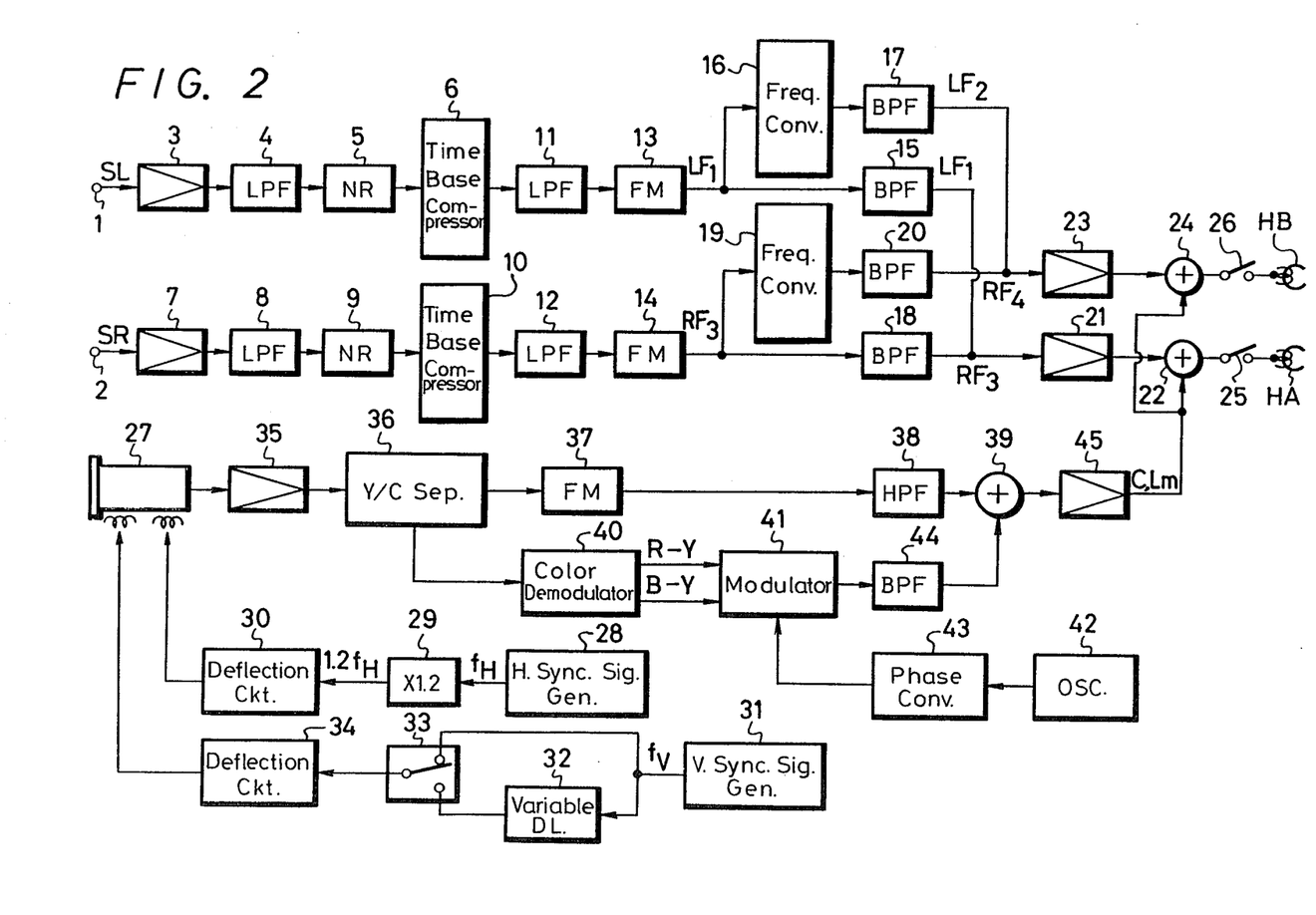
FIG. 2 is a systematic block diagram of an audio and video signal recording apparatus according to an embodiment of the present invention.

Referring now to FIG. 2, it will be seen that an apparatus for recording video and audio signals according to an embodiment of the present invention has audio input terminals 1 and 2 to which audio signals, for example, a stereophonic left channel signal SL and a stereophonic right channel signal SR are respectively applied. The left channel signal SL is supplied through an amplifier 3, a low pass filter 4 and a noise reduction circuit 5, which compresses a dynamic range of the input audio signal, to a time base compressor 6. Similarly, the right channel signal SR is supplied through an amplifier 7, a low pass filter 8 and a noise reduction circuit 9 to a time base compressor 10. The low pass filters 4 and 8 are used to cut off high frequency components which will cause the noise reduction circuits 5 and 9 to misoperate. Further, low pass filters 4 and 8 cut off a frequency component constituting more than $\frac{1}{2}$ the sampling frequency in time base compressors 6 and 10 and thereby prevent an aliasing signal from occurring. In noise reduction circuits 5 and 9, the dynamic ranges of the audio signals are compressed, while, in time base compressors 6 and 10, the time bases of the respective audio signals are compressed. The stereo left and right channel signals SL and SR which have had their time bases compressed by time base compressors 6 and 10 are then supplied through low pass filters 11 and 12 to frequency modulators 13 and 14, respectively.

In frequency modulator 13, a carrier having a frequency $f_1$, for example $f_1 = 1.59$ ($1.325 \times 1.2$) MHz is frequency-modulated by the left channel signal SL with a frequency deviation width ranging, for example, from about 120 ($100 \times 1.2$) to 180 ($150 \times 1.2$) KHz, and a frequency modulated left channel signal (hereinafter referred to as an FM left channel signal) $LF_1$ is provided at its output. This FM left channel signal $LF_1$ is supplied to a band pass filter 15 and also to a frequency converting circuit 16. Frequency converting circuit 16 is supplied with an oscillation output having a frequency $f_0$, for example, $f_0 = 180$ ($150 \times 1.2$) KHz, from a local oscillator (not shown), and FM left channel signal $LF_1$ is frequency-converted by this oscillation output to thereby provide an FM-modulated signal having a carrier frequency $f_1 - f_0$ and an FM-modulated signal having a carrier frequency $f_1 + f_0$ at the output of circuit 16. The output of circuit 16 is connected to a band pass filter 17, and only the FM signal having the carrier frequency $f_1 + f_0$ is passed by band pass filter 17 as a frequency-converted left FM signal $LF_2$. This FM left channel signal $LF_2$ has a carrier frequency $f_2$ higher than the frequency $f_1$, for example, $f_2 = f_1 + f_0 = 1.77$ ($1.475 \times 1.2$) MHz. The frequency deviation width of the FM left channel signal $LF_2$ is the same as that of the FM left channel signal $LF_1$.

In FM modulator 14, a carrier having a frequency $f_3$ which is higher than the frequency $f_2$ by, for example, 180 ($150 \times 1.2$) KHz, that is, $f_3 = 1.95$ ($1.625 \times 1.2$) KHz, is frequency-modulated by the right channel signal SR with a frequency deviation of, for example, about 120 ($100 \times 1.2$) to 180 ($150 \times 1.2$) KHz. Thus, an FM-modulated right signal (hereinafter referred to as FM right channel signal) $RF_3$ is generated at the output of modulator 14. This FM right channel signal $RF_3$ is supplied to a band pass filter 18 and also to a frequency converting circuit 19. The frequency converting circuit 19 is also supplied with the oscillation output having the frequency $f_0$ from the earlier mentioned local oscillator. In circuit 19, the FM right channel signal $RF_3$ is frequency-converted by this oscillation output and thereby an FM-modulated signal having a carrier frequency $f_3 - f_0$ and an FM-modulated signal having a carrier frequency $f_3 - f_0$ are provided at the output of circuit 19 which is connected to a band pass filter 20. Of these FM-modulated signals, only the FM-modulated signal having the carrier frequency $f_3 + f_0$ is passed through band pass filter 20 as a frequency-converted FM right channel signal $RF_4$. This FM right channel signal $RF_4$ has a carrier frequency $f_4$ higher than the carrier frequency $f_3$, for example, $f_4 = f_3 + f_0 = 2.13$ ($1.775 \times 1.2$) MHz. Also, the frequency deviation width of signal $RF_4$ is the same as that of the right FM signal $RF_3$, and also the same as the left FM signals $LF_1$ and $LF_2$.

Figures 3A, 3B:
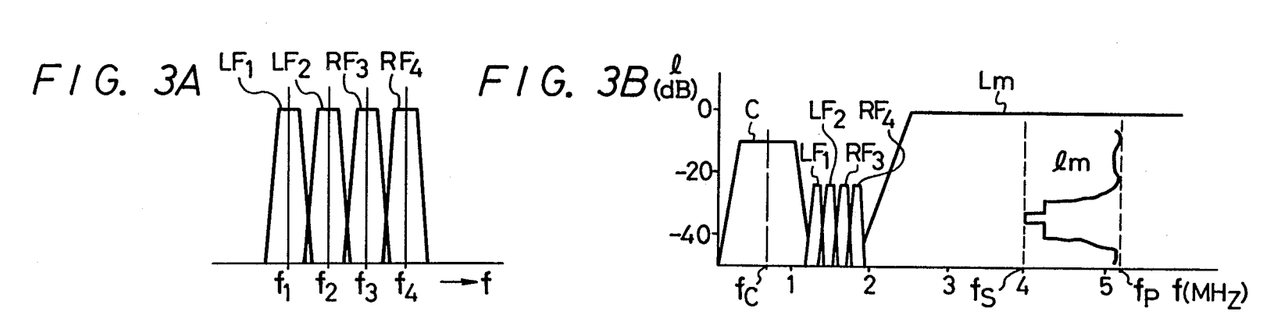
FIGS. 3A and 3B are frequency spectrum diagrams to which reference will be made in explaining the operation of the embodiment shown in FIG. 2.

As described above, there are generated left FM signals $LF_1$ and $LF_2$ and right FM signals $RF_3$ and $RF_4$ having carrier frequencies $f_1$, $f_2$, $f_3$ and $f_4$, respectively, and the frequency deviation widths of which are adjacent to one another in sequence, as shown on FIG. 3A. The left FM signal $LF_1$ and the right FM signal $RF_3$ are supplied through an amplifier 21 to one input terminal of a composer or combining circuit 22, while the left FM signal $LF_2$ and the right FM signal $RF_4$ are supplied through an amplifier 23 to one input terminal of a composer or combining circuit 24. The spacing or distance between the adjacent frequencies of the frequencies f, $f_2$, $f_3$ and $f_4$ is selected such that the beat noise component between the left FM signal and the right FM signal, after being demodulated, is outside the band of the reproduced audio signal. In the above described example, this distance is 180 ($150 \times 1.2$) KHz. As shown by the frequency spectrum of FIG. 3A, these left FM signals $LF_1$ and $LF_2$ and right FM signals $RF_1$ and $RF_2$, which are positioned sequentially, have a constant distance between the central frequencies of adjacently situated signals which have varying frequency deviation widths. In the illustrated case, the adjacent frequency deviation widths are positioned very closely and even overlap at their maximum values, and the overall frequency width is relatively narrow.

In combining circuit 22, the mixed output of left FM signal $LF_1$ and right FM signal $RF_3$ from amplifier 21 is mixed with a carrier chrominance signal C and a frequency-modulated luminance signal Lm which are supplied to another input terminal of combining circuit 22. Similarly, in combining circuit 24, the mixed output of left FM signal $LF_2$ and right FM signal $RF_4$ from amplifier 23 is mixed with the signals C and Lm supplied to another input of circuit 24.

The carrier chrominance signal C is provided by directly low frequency converting a carrier chrominance signal separated from a color video signal derived from a video camera such that the color sub-carrier frequency $f_c$ thereof becomes lower than the frequency $f_1$, for example, $f_c = 826$ ($688 \times 1.2$) KHz. The frequency-modulated luminance signal Lm is provided by carrying out such frequency modulation so that the tip of the synchronizing signal of the color video signal becomes a frequency $f_s$ sufficiently higher than the above mentioned frequency $f_4$, for example, $f_s = 4$ MHz, and further so that the white peak (maximum amplitude portion) becomes a frequency $f_p$ which is higher than the frequency $f_s$ by a predetermined frequency, for example, 1.2 MHz, in which case $f_p = 5.2$ MHz. As shown on FIG. 3B, the level of the carrier chrominance signal C is selected to be higher, for example, by about 15 dB, than any levels of the left FM signals $LF_1$ and $LF_2$ and the right FM signals $RF_3$ and $RF_4$, and the level of the frequency modulated luminance signal Lm is selected to be higher, for example, by about 10 dB, than the level of chrominance signal C. As will be clear from FIG. 3B, the left FM signals $LF_1$ and $LF_2$ and the right FM signals $RF_3$ and $RF_4$ are sequentially positioned in close positional relation to each other within a narrow frequency band between the upper side limit of the band of the frequency converted carrier chrominance signal C and the lower side limit of the band of the frequency modulated luminance signal Lm. The signals $LF_1$, $LF_2$, $RF_3$ and $RF_4$ are prevented from oppressing the frequency bands of the carrier chrominance signal C and the frequency modulated luminance signal Lm as much as possible. In FIG. 3B, reference letter lm designates an original luminance signal of the color video signal before being frequency modulated. Although the signals LF$_1$, LF$_2$, RF$_3$ and RF$_4$ are shown to have the same levels, relatively small level differences may be provided between the left FM signals LF$_1$ and LF$_2$ and between the right FM signals RF$_3$ and RF$_4$, if necessary.

Turning back to FIG. 2, it will be seen that the first mixed output from combining circuit 22, and which is formed of carrier chrominance signal C, frequency modulated luminance signal Lm, left FM signal LF$_1$ and right FM signal RF$_3$, is supplied through a switch 25 to rotary magnetic head HA. Similarly, the second mixed output from combining circuit 24, and which is formed of carrier chrominance signal C, frequency modulated luminance signal Lm, left FM signal LF$_2$ and right FM signal RF$_4$, is supplied through a switch 26 to rotary magnetic head HB. The switches 25 and 26 are alternately switched by a switching pulse having a frequency of 60 Hz. These rotary magnetic heads HA and HB are arranged to have different azimuth angles and alternately form slant or skewed tracks with no guard band therebetween on the magnetic tape so that the first and second mixed outputs are alternately recorded during successive vertical periods, respectively, or during predetermined periods of successive fields. In other words, two adjacent slant tracks are formed on the magnetic tape by rotary magnetic heads HA and HB, respectively, and the first and second mixed outputs are azimuth-recorded in such two adjacent tracks, respectively. Accordingly, with respect to the audio signals, left FM signal LF$_1$ and right FM signal RF$_3$ recorded in one of the two adjacent tracks have frequency bands spaced from each other. Similarly, left FM signal LF$_2$ and right FM signal RF$_4$ recorded in the other of the adjacent tracks have frequency bands which are not adjacent to each other. Further, the carrier frequencies of the audio signals recorded in the adjacent slant tracks do not coincide with each other.

Since rotary magnetic heads HA and HB can not be mounted at the same location on the tape guide drum, they are mounted at respective positions which are spaced apart by an angular spacing α (FIG. 1). The angular spacing α is selected so that the magnetic head HB is delayed relative to the magnetic head HA by a delay of 1.5 T, with T being a horizontal or line period corrected by the following equations:

$$T = \frac{1}{f_H'} \quad (1)$$

$$f_H' = \frac{360°}{\theta} \cdot f_H \quad (2)$$

in which $f_H$ is the standard horizontal scanning frequency in the NTSC system or CCIR system and is a wrap angle of the magnetic tape around the tape guide drum. In the illustrated embodiment of this invention, 270° < θ < 360°, and, by way of example, θ = 300°.

The magnetic heads HA and HB are rotated in the counterclockwise direction at the normal field frequency of 60 Hz for the NTSC system and 50 Hz for the CCIR system.

Figures 4A, 4B:
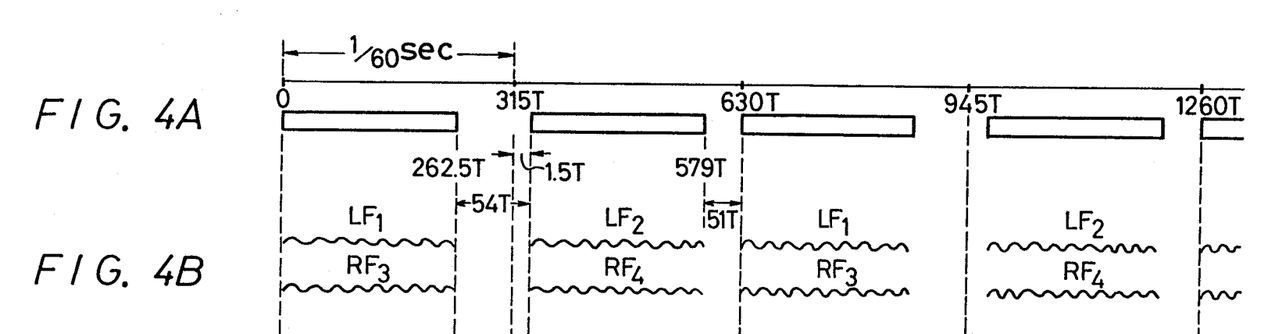
FIGS. 4A to 4F are respective timing diagrams to which reference will be made in explaining the operation of the embodiment shown in FIG. 2.

FIG. 4A illustrates the timing of the successive scannings of the tape by heads HA and HB, alternately, starting from the time at which head HA reaches a position corresponding to the initial position in the range of the tape wrap angle θ. During a period (0 to 262.5 T in time base) in which head HA scans the magnetic tape over the range of the tape wrap angle θ, a recording signal including signals LF$_1$ and RF$_3$ corresponding to the audio signal for one field is recorded, as shown in FIG. 4B. If magnetic heads HA and HB were mounted at the same position on the tape guide drum, a recording signal corresponding to the audio signal for the next field would be recorded starting at the timing shown by 315 T on the time base in FIG. 4A.

However, as described above, head HB is mounted at a position displaced from head HA by the angular spacing α. As a result of the foregoing, the recording signal corresponding to the audio signal for the next field is recorded beginning at the timing which is delayed 1.5 T from the timing 315 T. In other words, HA contacts the magnetic tape over the range of the tape wrap angle θ to record the signal for the period 262.5 T. The interval of 54 T (52.5 T + 1.5 T) until head HB reaches the recording start point, that is, one end of the range of the tape wrap angle θ, so as to carry out recording in the next track becomes an over scan area in which head HA does not contact the magnetic tape. On the other hand, before head HB reaches the concluding end of the range of the tape wrap angle θ, head HA is already at the recording start point so that the over-scan area of the head HB corresponds to an interval of 51 T (52.5 T − 1.5 T).

From the timing of 630 T, recording is again carried out by head HA and the above described operations will be carried out repeatedly. A field FA in which recording is effected by magnetic head HA and a field FB in which recorded is effected by magnetic head HB are defined by a vertical synchronizing signal Sv shown in FIG. 4C. It will be appreciated that the audio signal for each field is time base compressed to a predetermined extent for the respective field and then recorded.

Figure 4C:
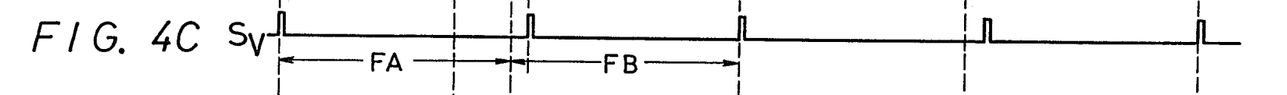

Turning back to FIG. 2, it will be seen that the vertical scanning of an image pickup tube 27 is effected in synchronism with the vertical synchronizing signal Sv shown in FIG. 4C, while the horizontal scanning of tube 27 is effected insynchronism with a horizontal synchronizing signal having the frequency (1/T). During a field FA, horizontal scanning is carried out 262.5 times, and then horizontal scanning, or more properly, over-scanning, is carried out 54 times outside the effective area of target or picture screen. Then, during the next field FB, horizontal scanning starts at the center of the upper portion of the effective picture screen and the horizontal scanning is carried out 262.5 times. Thereafter, horizontal over-scanning is carried out 51 times, and then horizontal scanning returns again to the left hand end of the upper portion of the effective picture area of the screen. Thus, interlaced scanning is carried out in image pickup tube 27.

For control of the scanning in tube 27, the apparatus of FIG. 2 includes a horizontal synchronizing signal generating circuit 28 which generates a horizontal synchronizing signal having a normal frequency $f_H$. This horizontal synchronizing signal having the frequency $f_H$ is converted to a signal having a frequency of 360°/θ × $f_H$, that is, 1.2 $f_H$, in the case where θ = 300° by a multiplying circuit 29. The signal with the frequency of 1.2 $f_H$ is fed to a horizontal deflection circuit 30 in which a sawtooth wave signal is generated and applied to image pickup tube 27.

A vertical synchronizing signal generating circuit 31 provides a vertical synchronizing signal $f_V$ which is supplied directly and through a variable delay circuit 32 to two contacts, respectively, of a switching circuit 33. The variable delay circuit 32 can vary the amount or time of the delay effected thereby around a predetermined delay time. If the timing relation is as shown in FIG. 4A, the vertical synchronizing signal generated by vertical synchronizing signal generating circuit 31 has a field period of 315 T, and the variable delay circuit 32 has a delay amount or delay time which is variable around 1.5 T. On the basis of a control pulse having the frequency of 60 Hz, switching circuit 33 alternately selects and delivers the vertical synchronizing signal directly from circuit 31 and the vertical synchronizing signal passed through variable delay circuit 32. The timing at which switching circuit 33 is switched from one position to the other by the control pulse is substantially coincident with the intermediate portion of the period in which rotary magnetic head HA or HB is out of contact with the magnetic tape. This control pulse can be formed from the vertical synchronizing signal derived from the vertical synchronizing signal generating circuit 31.

The vertical synchronizing signal developed at the output side of switching circuit 33 is as shown on FIG. 4C and is supplied to a vertical deflection circuit 34 in which a corresponding sawtooth wave signal is generated and then fed to image pickup tube 27 for causing the interlaced scanning to be carried out in tube 27.

The color video signal from image pickup tube 27 is supplied through an amplifier 35 to a luminance/chrominance signal separator (Y/C separator) 36 in which a luminance signal and a carrier chrominance signal are separated from the color video signal. The separated luminance signal is frequency modulated by a frequency modulator 37 and then supplied through a high pass filter 38 to one input terminal of an adding circuit 39.

The separated carrier chrominance signal is supplied from separator 36 to a color demodulator 40 in which it is demodulated to red and blue color difference signals R-Y and B-Y fed to a modulator 41 in which they are orthogonally modulated. An oscillation output having a frequency of 826 (688×1.2) KHz is supplied from an oscillator 42 through a phase converter 43 to modulator 41 for processing the color signal so that a field in which the color carrier has its phase inverted at every horizontal period is alternated with a field in which the color carrier has a constant phase. The output from modulator 41 is supplied to a band pass filter 44 which passes a carrier chrominance signal having a frequency of 826 KHz. This carrier chrominance signal is supplied to another input terminal of adding circuit 39 in which it is added with the frequency modulated luminance signal derived from high pass filter 38. The combined luminance signal and carrier chrominance signal added are supplied through an amplifier 45 to second input terminals of combining circuits 22 and 24 in which they are combined with the first and second mixed audio outputs $LF_1$, $RF_3$ and $LF_2$, $RF_4$, respectively.

The combined luminance signal and carrier chrominance signal are recorded by magnetic heads HA and HB similarly to the above mentioned mixed audio outputs. Specifically, during a period (time base from 0 to 262.5 T) in which magnetic head HA scans the tape in the range of its wrap angle $\theta$, a recording signal corresponding to the video signal for one field and which has been derived from image pickup tube 27 is recorded as shown in FIG. 4A. If the magnetic heads HA and HB where located at the same position on the tape guide drum, it will be appreciated that the recording signal corresponding to the video signal for the next field would be recorded beginning at the time indicated at 315 T on the time base. However, as described above, magnetic head HB is mounted at a position spaced apart from magnetic head HA by the angle $\alpha$ so that the recording signal corresponding to the video signal for the next field is recorded beginning at the time which is delayed by 1.5 T from the time 315 T. Therefore, in respect to the recording of the video signal, the over-scan area of 54 T occurs in the field FA, while the over-scan area of 51 T occurs in the field FB in FIG. 4A for reasons similar to those given in respect to the audio signals.

Then, beginning at the time indicated at 630 T, recording is again carried out by magnetic head HA, and alternate similar recordings by heads HA and HB are repeatedly carried out. Also in this case, the field FA in which the recording is carried out by magnetic head HA and the field FB in which the recording is carried out by magnetic head HB are specified by the vertical synchronizing signal Sv shown in FIG. 4C.

Figure 4D:
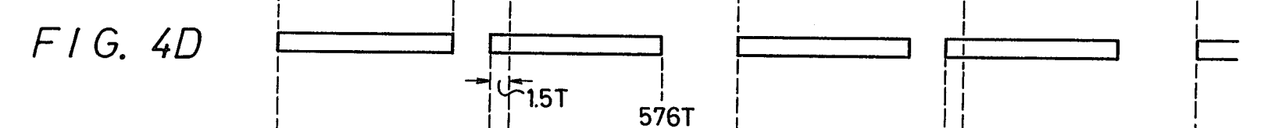
Figure 4E:
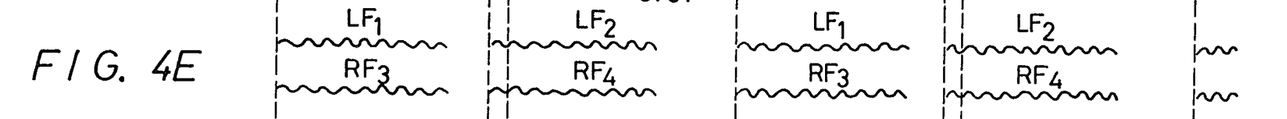
Figure 4F:
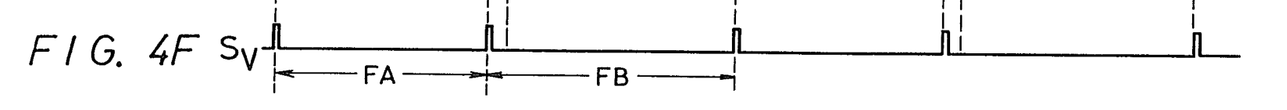

Further, it is possible to arrange magnetic head HB to precede magnetic head HA by the angle $\alpha$. In that case, as shown in FIGS. 4D and 4E, after recording by the magnetic head HA, recording is carried out by magnetic head HB during the period of 252.5 T which commences 1.5 T before the time 315 T. A vertical synchronizing signal Sv used in such case is shown in FIG. 4F, and the vertical deflection is carried out in the image pickup tube 27 in synchronism with the vertical synchronizing signal Sv of FIG. 4F.

While luminance signal Lm and chroma signal C having the special timing in alternate fields FA and FB are provided by the special beam scanning in image pickup tube 27 as described above, when a normal video signal, for example, from a broadcasting station is received by a tuner and recorded by the VTR according to this invention, the normal video signal must be time base compressed to the signal form described above with reference to FIG. 4A or FIG. 4D. In such case, it is possible to suitably time base compress the video signal by using a digital memory.

Figure 5:
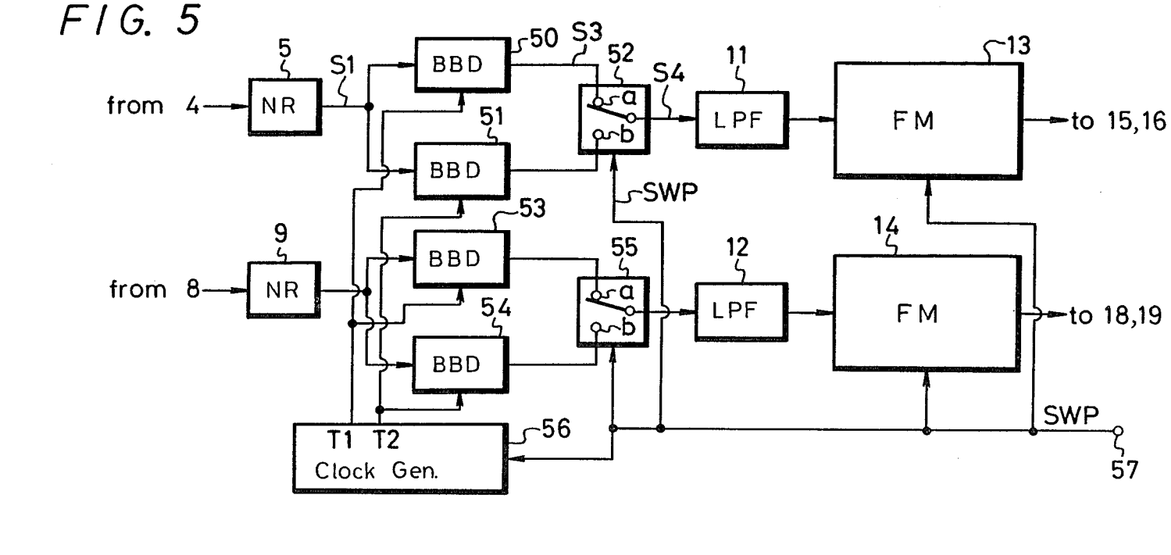
FIG. 5 is a block diagram showing a time base compressing arrangement for the audio signal in accordance with one embodiment of the present invention.

Referring now to FIG. 5, it will be seen that time base compressors 6 and 10 of the circuit shown in FIG. 2 may be comprised of bucket brigade devices (BBDs). More particularly, BBDs 50 and 51 are shown to be connected in parallel to the output of noise reduction circuit 5, and the outputs of BBDs 50 and 51 are connected to contacts a and b, respectively, of a switching circuit 52. The common contact of switching circuit 52 is connected to the input of low pass filter 11. In like manner, BBDs 53 and 54 are connected in parallel to the output of noise reduction circuit 9 and the outputs of BBDs 53 and 54 are connected to contacts a and b, respectively, a switching circuit 55. The common contact of switching circuit 55 is connected to the input of low pass filter 12. The BBDs 50 and 53 are operated so as to compress the time base of the audio signal of each field FA, while BBDs 51 and 54 are operated so as to compress the time base of the audio signal of each field FB.

A clock generator 56 is provided to generate clock signals by which information is written in, or read out from BBDs 50, 51 and 53, 54. The clock signal from a clock output terminal T1 is supplied to BBDs 50 and 53, while the clock signal from a clock output terminal T2 is supplied to BBDs 51 and 54. The clock signals from the clock output terminals T1 and T2 are changed in speed or frequency for writing and reading, respectively. The clock speed or frequency in the reading mode is made 1.2 times that in the writing mode.

A switching pulse SWP (FIG. 6B) for switching heads HA and HB is also supplied from a terminal 57 to frequency modulators 13 and 14, switching circuits 52 and 55 and clock generator 56.

Figure 6A:
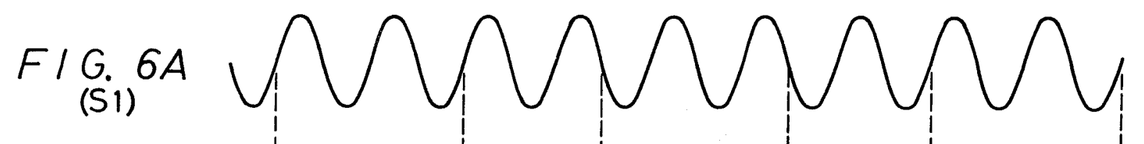
FIGS. 6A to 6E are respective waveform diagrams to which reference will be made in explaining the operation of the embodiment shown in FIG. 5.
Figure 6B:
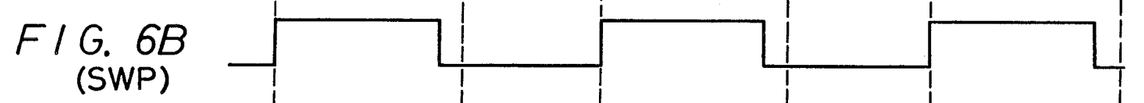
Figure 6C:
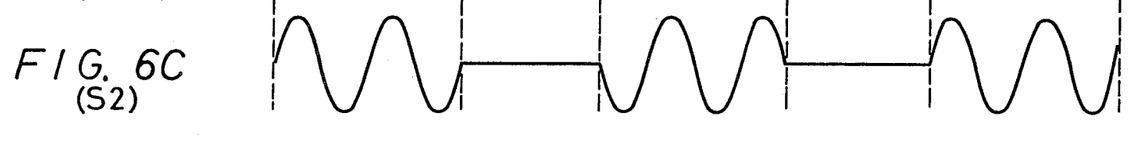
Figure 6D:
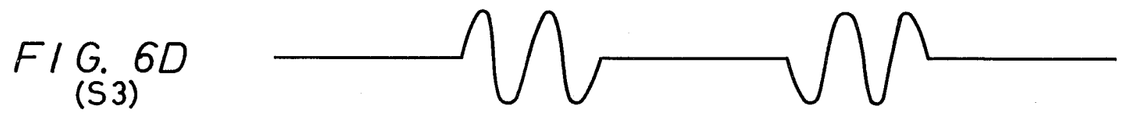
Figure 6E:
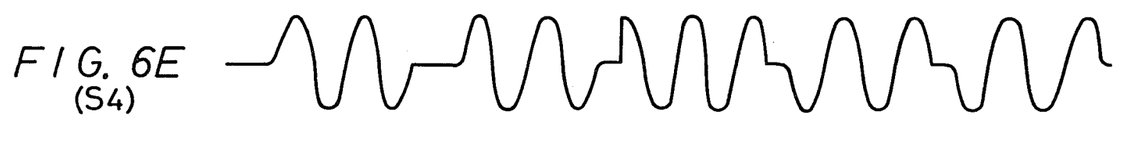

When a signal S1 shown in FIG. 6A is supplied from noise reduction circuit 5 to BBDs 50 and 51, during a period in which switching pulse SWP (FIG. 6B) is at high level, signal S1 is written in BBD 50 as shown in FIG. 6C by S2. At that time, the writing time is made a little longer than the high level period of switching pulse SWP (corresponding to one field) because the writing is carried out during a period somewhat longer than one field in consideration of compatibility with other VTRs which are not formed as a unit with a camera. Then, during a period in which switching pulse SWP is at low level, a signal S3 whose time base is compressed, as shown in FIG. 6D, is read out from BBD 50. The operation of BBD 51 is exactly opposite to the described operation of BBD 50. As a result, at the output side of switch 52 there is generated an output signal S4 which is derived from the BBDs 50 and 51 and whose time base is time compressed, as shown in FIG. 6E.

A similar operation is carried out by BBDs 53 and 54 and, hence, at the output of switching circuit 55 there is generated a consecutive signal which is derived from BBDs 53 and 54 and whose time base is compressed.

Figure 7:
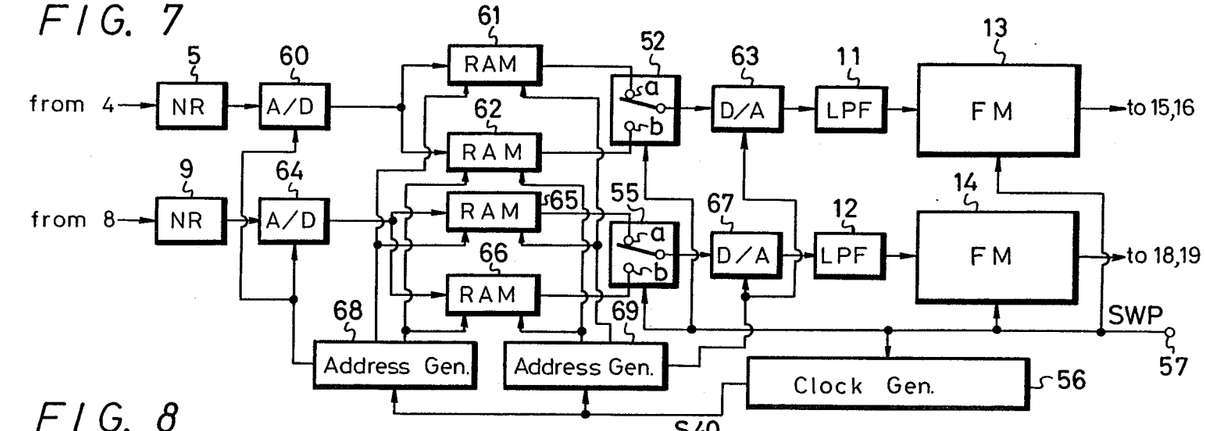
FIG. 7 is a block diagram showing an audio time base compressing arrangement according to another embodiment of the present invention.

FIG. 7 shows an embodiment of this invention in which an A/D (analog-to-digital) converter, a D/A (digital-to-analog) converter and a RAM (random access memory) are used for each of time base compressors 6 and 10. In FIG. 7, parts corresponding to those described with reference to FIG. 5 are identified by the same reference numerals and will not be again described in detail.

More particularly, in FIG. 7, an A/D converter 60 is connected to the output of noise reduction circuit 5 and RAMs 61 and 62 are connected in parallel relation to the output of A/D converter 60. The outputs of RAMs 61 and 62 are respectively connected to contacts a and b of switching circuit 52, while the common contact of switching circuit 52 is connected to the input of low pass filter 11 through a D/A converter 63. In like manner, an A/D converter 64 is connected to the output of noise reduction circuit 9 and RAMs 64 and 66 are connected in parallel to the output of A/D converter 64. The outputs of RAMs 65 and 66 are connected respectively to contacts a and b of switching circuit 55, while the common contact of the switching circuit 55 is connected to the input of low pass filter 12 through a D/A converter 67. Since A/D converters 60 and 64 and D/A converters 63 and 67 are located after the noise reduction circuits 5 and 9, they can be operated with high quality or accuracy even when they are each formed of about 8 to 10 bits.

Further, a write address generating circuit 68 and a read address generating circuit 69 are provided, and each of circuits 68 and 69 is supplied with a clock signal from clock generator 56. The write address generating circuit 68 is adapted to alternately supply a write address signal to RAMs 61, 65 and RAMs 62, 66 at every field. In like manner, read address generating circuit 69 is adapted to alternately supply a read address signal to RAMs 61, 65 and RAMs 62, 66 at every field. The frequency of the read address signal from read address signal generating circuit 69 is selected to be 1.2 times the write address signal from write address signal generating circuit 68, whereby to carry out the time base compression.

A sampling pulse from write address generating circuit 68 is supplied to A/D converters 60 and 64, while a sampling pulse from read address generating circuit 69 is supplied to D/A converters 63 and 67. The frequency relationship between these sampling pulses is similar to that described above for the write and read address signals.

Figure 8:
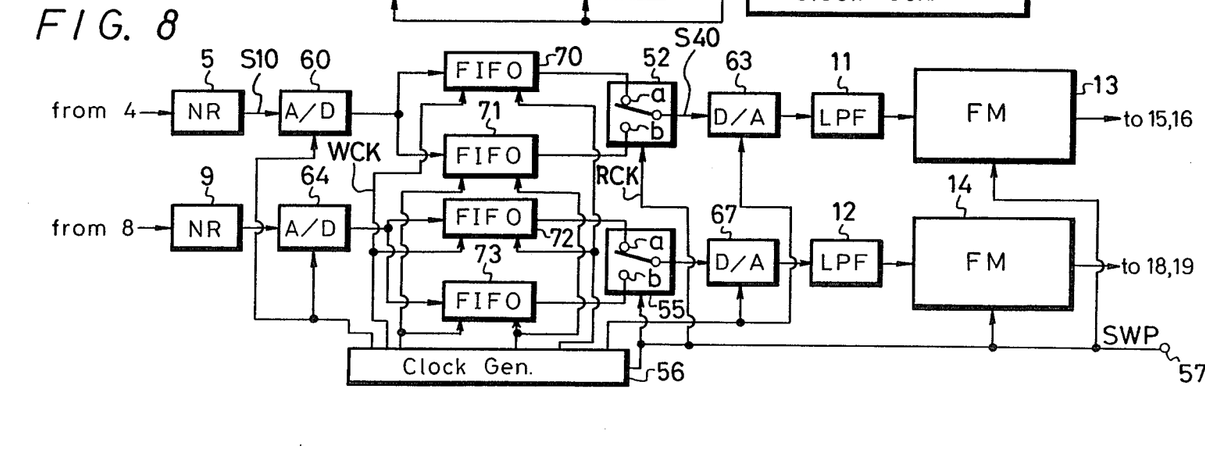
FIG. 8 is a block diagram showing an audio time base compressing arrangement according to a further embodiment of the present invention.

FIG. 8 shows another embodiment of the invention in which an A/D converter, a D/A converter and first in first out (FIFO) circuits are used for each of time base compressors 6 and 10. In FIG. 8, parts corresponding to those described with reference to FIGS. 5 and 7 are again identified by the same reference numerals and will not be described in detail.

More particularly, in the embodiment of FIG. 8, FIFO circuits 70 and 71 are connected in parallel to the output of A/D converter 60, and the outputs of FIFO circuits 70 and 71 are respectively connected to the contacts a and b of switching circuit 52. Similarly, FIFO circuits 72 and 73 are connected in parallel to the output of A/D converter 64, respectively. The outputs of FIFO circuits 72 and 73 are connected respectively to the contacts a and b of switching circuit 55. The clock generator 56 is adapted to alternately supply write clock signals to FIFO circuits 70, 72 and to FIFO circuits 71 and 73, at every field. In this case, the read clock signal is selected to be 1.2 times the write clock signal from the clock generator 56, whereby to carry out the time base compression.

Figure 9A:
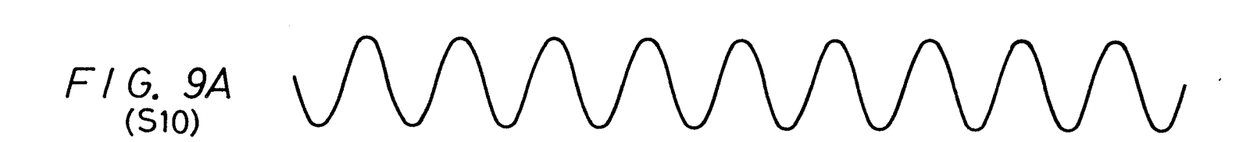
FIGS. 9A to 9G are respective waveform diagrams to which reference will be made in explaining the operation of the embodiment shown in FIG. 8.
Figure 9B:
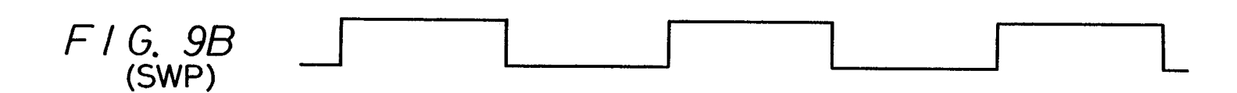
Figure 9C:
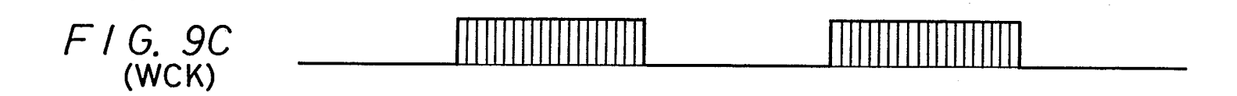
Figure 9D:
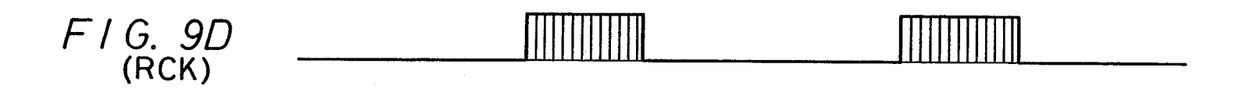
Figure 9E:
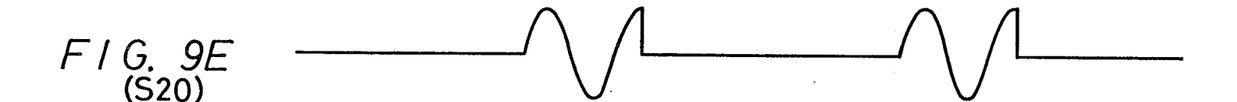

When a signal S10 (FIG. 9A) is supplied from noise reduction circuit 5 to A/D converter 60, this signal is converted from the analog signal to a digital signal by A/D converter 60 and then fed to FIFO circuits 70 and 71. When a write clock signal WCK (FIG. 9C) is supplied to FIFO circuit 70 out of synchronism with switching pulse SWP (FIG. 9B), the digital signal from A/D converter 60 is written in FIFO circuit 70. When FIFO circuit 70 is supplied with a read clock signal RCK (FIG. 9D) whose frequency is 1.2 times as high as the frequency of write clock signal WCK (FIG. 9C), at the output of FIFO circuit 70 there is generated an output signal S20 whose time base is compressed, as shown in FIG. 9E.

Figure 9F:
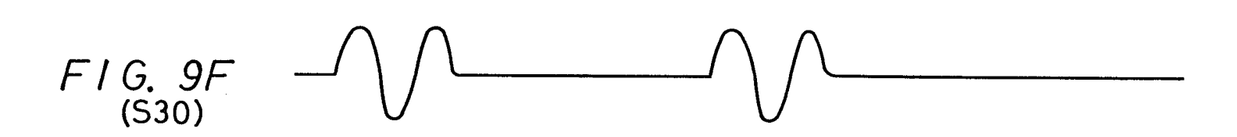
Figure 9G:
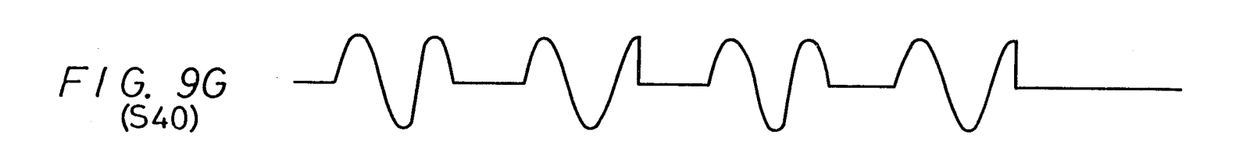

FIFO circuit 71 is repeatedly operated similarly to FIFO circuit 70, but with the timing of the operation of FIFO 71 being different from that of FIFO circuit 70 by one field. Therefore, FIFO circuit 71 generates, at its output, an output signal S30 whose time base is also compressed, as shown in FIG. 9F. Accordingly, at the output of switching circuit 52 there is obtained a signal S40 (FIG. 9G) in which the output signals from FIFO circuits 70 and 71 are arranged in a repeating sequence. This signal S40 is converted from a digital signal to an analog signal by D/A converter 63 and then fed through low pass filter 11 to frequency modulator 13.

A similar operation is carried out for FIFO circuits 72 and 73 with the result that switching circuit 55 generates, at its output, an output signal in which the output signals from FIFO circuits 72 and 73 are time compressed and arranged in sequence.

When BBDs are employed as the time base compressor, a delay of one field occurs between the writing mode and the reading mode. However, when FIFO circuits are employed as the time base compressor, writing and reading are carried out substantially simultaneously so that a time base compression operation which is substantially in a real time fashion becomes possible. Thus, the audio signal and the video signal can be substantially synchronized with each other. This has the advantage of making inconspicuous any displacement of the so-called lip sync.

In the above described embodiments, the video signal and the audio signal are frequency multiplexed and then recorded. However, if an independent recording amplifier, a rotary transformer, a magnetic head and the like are employed, the present invention can be applied to so-called deep layer recording in which the FM audio signal is recorded on the tape at its lower layer or side in which the FM luminance signal is recorded.

As set forth above, generally in accordance with the present invention, a video tape recorder is provided in which a video signal having its time base compressed to 1/N that of the standard television signal is recorded on the tape in one slant track or skew track which contains the video information for one field of the standard television signal, the time base of the input audio signal is compressed similarly to the 1/N time base compressed video signal, and such time base compressed audio signal is recorded together with the above mentioned video signal so that the so-called AFM system recording can be effected even by an 8 mm-VTR. Further, the time base compressor does not need to be of particularly high quality and hence an apparatus according to the invention can be made inexpensively.

In addition, according to the present invention, the audio signal is time base compressed after it has passed through the noise reduction circuit which improves the characteristic of the transmission system in which the FM audio system is inserted normally. Accordingly, even if the signal is time base compressed in the state of a base band signal before being frequency modulated, the quality of the signal degraded by the time base compression can be cancelled by the improvement in the aforementioned noise reduction circuit and hence this causes no disadvantage. In other words, it is not necessary to substantially increase the quality of the time base compressor.

Although preferred embodiments of the invention have been described in detail herein, it will be apparent that many modifications and variations could be effected therein by one skilled in the art without departing from the spirit or scope of the invention as defined by the appended claims.

What is claimed is:

1. A helical scan type magnetic recording apparatus for recording video and audio signals on a magnetic tape wrapped about a reduced-size guide drum and in which a video signal has its time base compressed to 1/N that of a standard television signal and the time base compressed video signal is recorded in a standard recording format of slant tracks on said tape with video information of one field in each of said tracks; said apparatus comprising:

means for time base compressing a time base of an input audio signal in correspondence with said time base compressed video signal and including bucket brigade devices, means for writing said audio signal in said bucket brigade devices at one speed, and means for reading said audio signal from said bucket brigade devices at a faster speed for achieving said time base compressing of the audio signal in a way so that the time base compressed audio signal corresponding to each field of the video information is contemporaneous with the latter in said time base compressed video signal; means for frequency modulating a carrier signal by said time base compressed audio signal; means for mixing the time base compressed frequency modulated audio signal with the contemporaneous time base compressed video signal to provide a mixed signal; and rotary head means arranged to record said mxied signal on said tape while the latter is driven so as to provide said standard recording format.

2. A helical scan type magnetic recording apparatus for recording video and audio signals on a magnetic tape wrapped about a reduced-size guide drum and in which a video signal has its time base compressed to 1/N that of a standard televisoin signal and the time base compressed video signal is recorded in a standard recording format of slant tracks on said tape with video information of one field in each of said tracks; said apparatus comprising:

means for time compressing a time base of an input audio signal in correspondence with said time base compressed video signal and including analog/digital converting means for digitizing the audio signal, random access memory means for temporarily storing the digitized audio signal, means for writing and reading said digitized audio signal in said memory means at relatively slow and fast speeds, and digital/analog converting means for restoring to analog form the digitized audio signal read from said memory means so that the time base compressed audio signal corresponding to each field of the video information is contemporaneous with the latter in said time base compressed video signal; means for frequency modulating a carrier signal by said time base compressed audio signal; means for mixing the time base compressed frequency modulated audio signal with the comtemporaneous time base compressed video signal to provide a mixed signal; and rotary head means arranged to record said mixed signal on said tape while the latter is driven so as to provide said standard recording format.

* * * * *